Aug. 14, 1962     T. R. PAULSON     3,049,670
SOLAR ASPECT TELEMETER
Filed Jan. 16, 1959
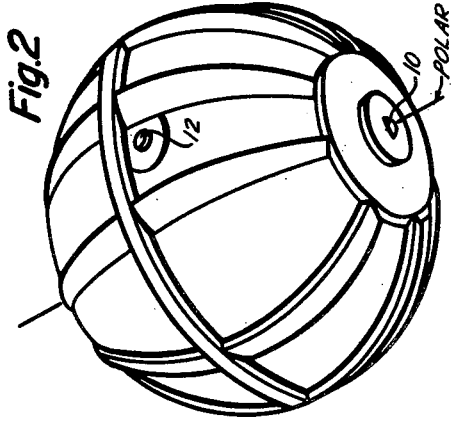
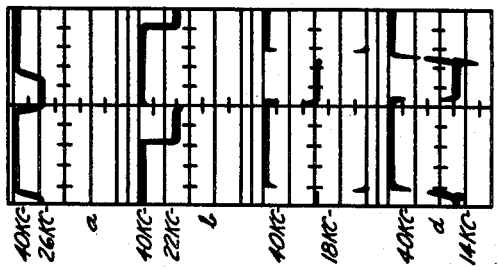
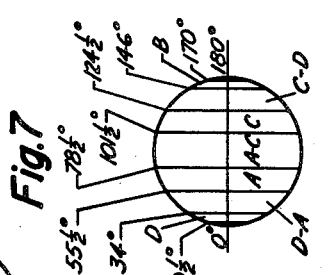
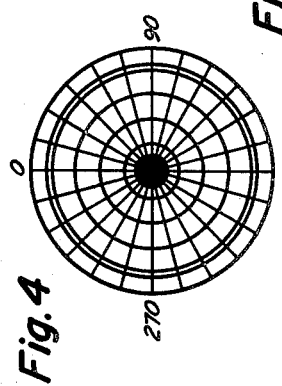
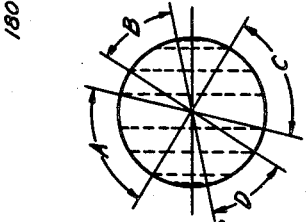
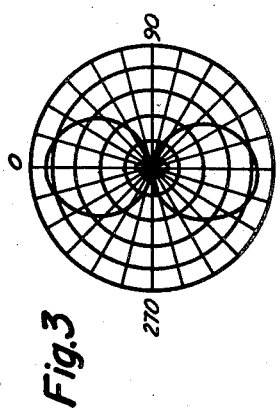
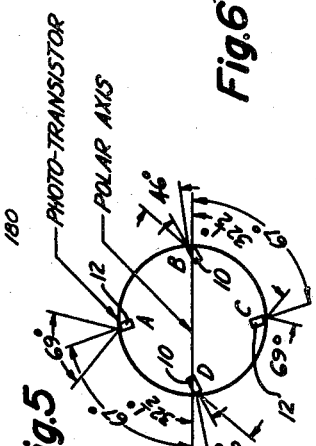
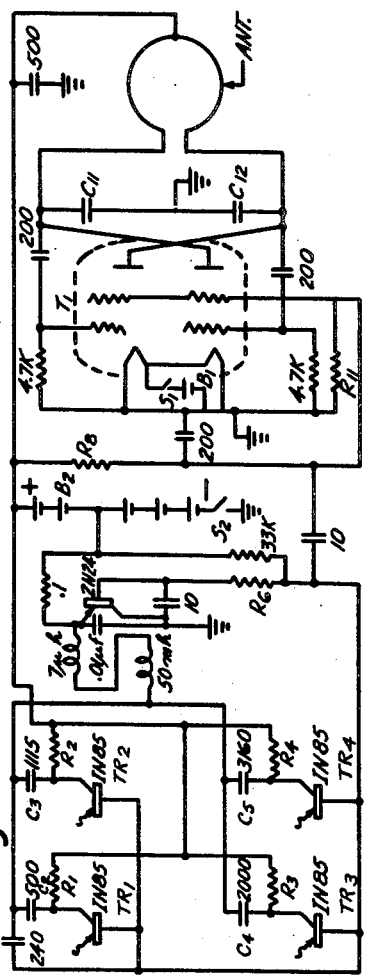
INVENTOR
Theodore R. Paulson
BY
ATTORNEY

United States Patent Office 3,049,670
Patented Aug. 14, 1962

3,049,670
SOLAR ASPECT TELEMETER
Theodore R. Paulson, Abingdon, Md., assignor to the United States of America as represented by the Secretary of the Army
Filed Jan. 16, 1959, Ser. No. 787,311
3 Claims. (Cl. 325—105)
(Granted under Title 35, U.S. Code (1952), sec. 266)

The invention described herein may be manufactured and used by or for the Government of the United States of America for governmental purposes without the payment to me of any royalty thereon.

This invention relates to a system for determining the gyrations of a falling body. More particularly, it relates to a system of telemetering whereby the tumbling motion of a falling bomblet is translated into a modulated radio signal which can be received and the demodulated signal recorded during the fall and subsequently deciphered. The radio signal is modulated by an ultra-sonic oscillator having a basic frequency which is varied by shunting different capacitances into the oscillating circuit. This shunting action in turn is accomplished by spacing several photo-transistors about the spherical bomblet and incorporating them into the circuit in such manner that any transistor exposed to the direct light of the sun serves to introduce a different capacitance into the circuit and consequently to alter the frequency of oscillation. By demodulating the radio signal these frequencies can be detected and recorded on magnetic tape. The magnetic tape recording can be transcribed to record the sequential occurrence of the ultra-sonic signals on an oscillograph. Data reduced from the oscillograph record makes it possible to determine which photo-transistor "sees" the sun at any time during the bomblets fall. This oscillogram record gives an accurate account of its motion during the fall and this data serves as a basis for design changes.

In the drawings,

FIG. 1 shows the complete modulating and transmitting circuit including four photo-transistors for altering the modulation frequency.

FIG. 2 shows the spherical bomblet with two phototransistors visible, one on the polar axis and one on the equator.

FIGS. 3 and 4 show the radiation pattern of the transmitting antenna.

FIGS. 5, 6 and 7 show the position of the phototransistors and the respective conical areas scanned by them.

FIG. 8 shows an oscillogram of the frequency shift of the modulator oscillator, as different "eyes" receive sunlight, with the respective frequencies appearing on the margins. Each oscillogram represents a different time period with the sweep rate being constant.

In the development of aerial munitions it is often desirable to design for self dispersing properties. In the present instance the spherical bomblet used with the present invention is of such small size that many of them are released in one drop. In order that the dispersal shall be uniform, it is necessary to design for such dispersal rather than to depend on random fall. The bomblet shown in FIG. 2 is ribbed in a manner to cause rotation under a free fall. This rotation in turn effects the dispersal pattern. It accordingly becomes important to know the rotational characteristics of different designs and the present invention is calculated to provide such information by equipping a bomblet with a V.H.F. radio transmitter including a transistorized low frequency modulator which operates at five different frequencies. These frequencies are controlled by "eye" photo-transistors which "look" out from the bomblet and are activated only by direct sunlight. Rotation and aspect changing during fall of the bomblet cause activation of different eyes and corresponding changes in the modulation frequency. A magnetic tape recording of the demodulated signal can be reduced to a graphic plot of aspect changes versus time.

The detailed structure of the device is shown in the drawings. The bomblet used (FIG. 2) is about 3 to 5½ inches in diameter and is ribbed in the manner shown. These ribs are shaped to induce various degrees of rotation during a free fall and this rotation in turn provides various degrees of lift making the bomblet traverse a wide angle in its fall. The bomblet is provided with four photo-transistor "eyes" at 10 on the polar axis and at 12 on the equatorial circumference. The photo-transistors are so orientated that each one has an individual field of vision forming a solid cone. Thus each polar element "sees" a conical angle of 46° and each equatorial transistor sees an angle of 69°. Also, the transistors are not perpendicular to a tangent to the surface, but are inclined to the perpendicular as shown. This geometry of the eye placements is such that only one eye can see the sun at a time. As the sphere rotates about its polar axis, one or alternately two eyes will see the sun during a portion of a revolution. Knowing which eye or eyes "see" the sun, during rotation of the unit, it can be determined that the sun's rays are perpendicular to the surface area of either end cap or one of seven spherical segments (FIG. 7). This information can be reduced to an expression of angular declination of the polar axis to a line intersecting the sun.

The amplitude modulated transmitter which provides a radio signal modulated at five different frequencies is shown in FIG. 1. It consists of a negative resistance push pull oscillator operating at 73 mc. A dual tetrode oscillator is screen grid modulated by the output of the transistor low frequency oscillator. The frequency of the radio transmitter circuit is determined by the values chosen for $C_{11}$ and $C_{12}$, which may vary between 15 and 20 $\mu\mu$fd. for a frequency of 73 mc. The loop antenna also serves as the resonating inductance. Values for $R_8$ and $R_{11}$ are chosen between 150 and 220K for $R_8$ and between 15 and 22K for $R_{11}$ to provide 12 ma. plate current. The transistor low frequency oscillator-modulator has a series resonant circuit consisting of $C_1$ and L. $C_{2,3,4,5}$ are shunted across $C_1$ by $TR_{1,2,3,4}$ individually to cause frequency shift. Values for $R_{1,2,3 \text{ and } 4}$ are chosen to determine the proper light level response and will vary between 5.6 and 10 meg. This circuit (FIG. 1) provides reasonable stability, adequate R.F. power, relatively low distortion at over 40% modulation and its performance is reproducible.

The unit is powered by a battery $B_2$ supplying 120–135 volts at 15 ma. and a filament battery $B_1$ supplying 1.35 volts at 0.2 ampere. The transmitter plate power input is 1.2 to 1.6 watts with the screen grid at plus 12 to 14 volts D.C. The modulating voltage at the screen grid is nominally 11 volts peak to peak. The minimum continuous life of the batteries is 5 minutes. The latter fact is unimportant since no attempts are made to retrieve or reuse the bombs and a free fall, even from 10,000 ft. takes only about a minute.

The modulator oscillator operates at a basic frequency of 40 kc. (FIG. 8). The four photo-transistors serve as switches to introduce additional capacitances and vary the frequency of the oscillating circuit. These frequencies are respectively 26, 22, 18 and 14 kc. The frequency shift that occurs when an "eye" receives direct sunlight is practically a switching action as shown by FIG. 8. This is occasioned by the resistance of the photo-transistor which is normally about one megohm, suddenly dropping to a couple hundred ohms on exposure to sunlight. This affects the shunting of the associated condenser across the circuit and thereby lowers the resonant frequency of the feedback loop. A momentary stoppage of oscillation, when the light intensity of the eye is reduced, can be observed at the two lower frequencies (FIGS. 8c and d). This condition can be corrected by changing the value of the biasing resistors on the photo-transistors with a loss in abruptness in frequency shift which is indicated slightly in FIG. 8a. Normally the units are adjusted so that a reasonable balance of these two undesirable characteristics exists and the data transmitted is of adequate quality.

Receiving the transmitted signals requires the use of helical antenna having a circularly polarized radiation field so as to eliminate polarization nulls. Amplitude nulls will exist due to the characteristic radiation pattern (FIGS. 3 and 4) of the transmitting antenna. The signal will be attenuated at least 10 db when the units polar axis and the receiving antenna lie in a plane which intersects the plane of the transmitting antenna at an angle of 60° or more. Accepting the equal probabilities of a unit assuming all possible altitudes, an attenuation of 10 db or more would be observed 13.4% of the time. The loss of signal during modulation by one of the "eye" frequencies has been minimized by the choice of the geometry of eye placements and test site set up.

Two helical receiving antennae are used, each having 70% response within a 45° conical field. The antenna are diverged, with fields slightly overlapping, so that the glide of the test bomblet will not carry it out of the antennae fields. A dual radio receiver is used followed by a dual channel amplifier. A dual channel triggered sweep oscilloscope monitors the demodulated signals and gives a visual indication of signal quality. The demodulated signals are passed through SKL model 302 dual filter units set for 10 kc. low and 50 kc. high cutoff. The filtered, demodulated signal from each receiver is fed to a separate channel of an ampex Model 307-3 magnetic tape, data recorder operated at 60"/sec. tape speed. The third channel of tape recorder is used for voice recording of notes and comments during test.

In conducting an actual aerial drop test, a test unit is turned on in the aircraft on radio command, the signal is tuned in by ground control, after which a radio command to drop the unit is given by ground control. The dropping altitude is 8000 to 10,000 ft. of a water target area and no attempt is made to recover the units.

The data, which is recorded on magnetic tape at high speed, is reduced to a graphical presentation for use in an analysis of the aerodynamic behavior of the test bomblets. The basic data reduction steps are: playback, frequency channelization, signal rectification, amplification and recording on a multi-channel, direct writing oscillograph. The data is played back at half speed, reducing the eye frequencies by one-half to an audible range, permitting aural determination as to which "eye" frequencies are contained on the tape. A test bomblet may or may not have registered all frequencies depending on the attitudes assumed by the falling bomblet. The required number of frequency channels are set up to channelize the data to the oscillograph. Each channel consists of a variable Q tunable circuit, an SKL model 302 filter set for band pass, a diode rectifier and a D.C. amplifier. The resonant frequency and Q of the tuned circuits and the band width of the SKL filters are adjusted to optimum values, dependent on actual and relative frequencies, background noise and signal amplitudes. The output of the D.C. amplifier is clipped to limit the pen travel of the oscillograph to 12 mm. independent of amplifier gain setting. At maximum paper speed, and magnetic tape playback at half-speed, 6 mm. paper distance represents one revolution of a unit rotating 5000 r.p.m. which provides adequate definition and timing.

The oscillograph recordings of the transcribed data represents a chronological record of the eye receiving sunlight during the bombs fall. This record can be interpreted as instantaneously indicating a zone, of the bomblet (FIG. 7), tangentially normal to a line intersecting the sun. Treating the annular center of each reference zone as an angular point, and considering the oscillograph record as showing angular point to time relationship, a plot of angle vs. time can be made. A faired curve of the plotted points would, by interpolation, show the angle formed by the intersection of the sphere's polar axis with a line intersecting the sun, versus time. The information thus obtained is valid except when a fixed attitude is indicated. The angular width of each reference point is nominally 23°, therefore a tangentially normal line could deviate within the latitude of a reference zone, causing no indication of change on the oscillograph record. Such deviation would most likely be periodic in nature due to the gyroscopic effects of rotation, and may be considered as a precessional yaw. The angle of yaw would be the deviation of the polar axis from the mean axis of rotation. For the deviation to lie within one zone (FIG. 7) the angle of yaw could not exceed 11½° with the probability being that it would be less than 6°. In the event that an instrumented test bomb was completely unstable in flight, the rotational velocity would be erratic and the indicated eye excitation would be random. In this condition, the attitude of the bomb would be of little concern and only negative results would be implied.

The information obtained from such tests of self dispersing bomblets provides basic knowledge as to actual lift based on rotational velocity, trajectory deviation as indicated by attitude changes and the nature of rotational aberrations that precede any periods of instability of the unit.

I claim:

1. A telemetering device comprising a shaped freely falling body, a low frequency oscillator-modulator circuit to modulate a V.H.F. radio transmitter in said body, said oscillator-modulator circuit including several different size condensers in parallel, each condenser having a phototransistor in series therewith, said phototransistors having a normally high resistance which falls to a low value when the phototransistor is exposed to the sun, whereby the particular condenser in series with said exposed phototransistor is introduced into the oscillator-modulator circuit to alter the frequency thereof, said phototransistors being arranged in positions about said body so that only one phototransistor can be exposed to the sun for any given position of the body in space.

2. A device in accordance with claim 1, wherein the shaped freely falling body is a spherical bomblet.

3. A device in accordance with claim 2, wherein four phototransistors are positioned in said body, one at each end of its polar axis and one at each end of an equatorial axis.

References Cited in the file of this patent
UNITED STATES PATENTS

| | | |
|---|---|---|
| 1,809,676 | Culver | June 9, 1931 |
| 2,640,973 | Cleaver | June 2, 1953 |
| 2,647,991 | Tatel et al. | Aug. 4, 1953 |
| 2,717,309 | Campbell | Sept. 6, 1955 |
| 2,790,088 | Shive | Apr. 23, 1957 |
| 2,862,416 | Doyle | Dec. 2, 1958 |
| 2,877,452 | Astin | Mar. 10, 1959 |
| 2,879,501 | Baran | Mar. 24, 1959 |

FOREIGN PATENTS

| | | |
|---|---|---|
| 573,406 | Great Britain | Nov. 20, 1945 |

OTHER REFERENCES

"Instrumentation and Telemetry," by Foley, "Journal of the British Interplanetary Society," July–August 1956, pp. 182–191.

"Telemetering in Earth Satellites," by Matthews, "Electrical Engineering," November 1957, pp. 976–981.

"The Vanguard Project," by Gatland, "Spaceflight," October 1956, pp. 15–28.